United States Patent
Norton et al.

(10) Patent No.: US 7,685,226 B1
(45) Date of Patent: Mar. 23, 2010

(54) MECHANISM FOR DATA MIGRATION ACROSS NETWORKS

(75) Inventors: Derk D. Norton, Louisville, CO (US); William F. Meine, Denver, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 585 days.

(21) Appl. No.: 11/499,158

(22) Filed: Aug. 3, 2006

(51) Int. Cl.
*G06F 15/16* (2006.01)

(52) U.S. Cl. .................................. 709/201; 370/338

(58) Field of Classification Search .............. 703/201; 370/338

See application file for complete search history.

(56) References Cited

U.S. PATENT DOCUMENTS

2004/0022221 A1* 2/2004 Chwieseni et al. .......... 370/338

OTHER PUBLICATIONS

Bishop, J.M., Stochastic Searching Networks, 1989, Proc. 1st IEE Conf. on Artificial Neural Networks, pp. 329-331.*
U.S. Appl. No. 11/499,157, Norton et al.
U.S. Appl. No. 11/499,159, Norton et al.

* cited by examiner

*Primary Examiner*—Wing F Chan
*Assistant Examiner*—Ruolei Zong
(74) *Attorney, Agent, or Firm*—Brooks Kushman P.C.

(57) ABSTRACT

In one embodiment, a method and apparatus for a mechanism for data migration across networks is disclosed. The method includes: randomly selecting a template from a local cache at an agent, the template indicating one or more characteristics of event data entities the agent is searching for; querying, via random connections from the agent, one or more other connected agents for the event data entities matching the template; if a matching event data entity for the template is found, returning the matching event data entity to the local cache of the agent; and if a matching event data entity for the template is not found, diffusing the template to the one or more other connected agents via a data diffusion process. Other embodiments are also disclosed.

14 Claims, 10 Drawing Sheets

MECHANISM FOR DATA MIGRATION ACROSS NETWORKS

FIELD OF INVENTION

An embodiment of the invention relates to network management, and more specifically, to a mechanism for data migration across networks.

BACKGROUND OF INVENTION

Data and event management networks provide an approach to remotely monitor and maintain many remote systems gathered under an organization. These remote systems may generate multiple events (e.g., hardware and software management events, application metrics, etc.) These events may produce indicators known as telemetry data. For example, telemetry data may include indicators that CPU utilization has dropped below a threshold, a file system is full, or a component has failed. This telemetry data may be utilized by the data and event management network to act on the remote systems to address the events. For instance, typical responses may include shutting down a remote system, triggering log file archiving, or scheduling a card replacement request, to name a few examples.

The transmission and management of system telemetry data for an organization's multitude of customer systems is a difficult problem. Current approaches to this problem utilize a traditional centralized event management architecture. This centralized event management architecture may have many global data centers that funnel their data through an event consolidation center to be analyzed and managed at various management consoles.

In such a system with a centralized event management structure, all systems events must be funneled through a central location. This central location acts as a bottleneck to the system events. The central location is also a single point-of-failure. Furthermore, replicating this central location can be prohibitively expensive. A problem with this traditional approach is that it cannot scale to handle millions of systems due to these central bottlenecks, single points-of-failure, and expense in replicating.

Furthermore, today's network environments are increasing in complexity at a geometric rate. The traditional centralized management structure tends to grow at a linear rate. This leads to a problem that eventually a critical point will be reached where the complexity of the managed network environment exceeds its manageability. As a result, under a centralized approach, increased complexity leads to increased system management costs. Furthermore, human intervention is much more expensive than automated responses. Human and system management resources cannot grow geometrically and, in many cases, the human resource allocation is shrinking. This results in a manageability gap.

A system that achieves global system event monitoring and management in a way that scales to handle a very large number of systems in a cost-effective manner and that is highly resilient to changes and failures in the global environment would be beneficial.

SUMMARY OF INVENTION

The present invention includes novel methods and apparatus for a mechanism for data migration across networks.

According to one embodiment of the invention, a method is disclosed. The method includes: randomly selecting a template from a local cache at an agent, the template indicating one or more characteristics of event data entities the agent is searching for; querying, via random connections from the agent, one or more other connected agents for the event data entities matching the template; if a matching event data entity for the template is found, returning the matching event data entity to the local cache of the agent; and if a matching event data entity for the template is not found, diffusing the template to the one or more other connected agents via a data diffusion process.

According to another embodiment of the invention, an apparatus is disclosed. The apparatus includes a local cache to maintain event data of a data management network without utilizing a central management server and a data diffusion engine coupled to the local cache and including a migration module. The migration module is further to: randomly select a template from the local cache, the template indicating one or more characteristics of event data entities the apparatus is searching for; query, via random connections from the apparatus, one or more other connected agents for the event data entities matching the template; if a match for the template is found, return the matching event data entities to the local cache; and if a match for the template is not found, diffuse the template to the one or more other connected agents via a data diffusion process.

BRIEF DESCRIPTION OF THE DRAWINGS

The invention may be best understood by referring to the following description and accompanying drawings that are used to illustrate embodiments of the invention. In the drawings.

DETAILED DESCRIPTION

A method and apparatus are described for a mechanism for data migration across networks. According to one embodiment, the method includes: randomly selecting a template from a local cache at an agent, the template indicating one or more characteristics of event data entities the agent is searching for; querying, via random connections from the agent, one or more other connected agents for the event data entities matching the template; if a matching event data entity for the template is found, returning the matching event data entity to the local cache of the agent; and if a matching event data entity for the template is not found, diffusing the template to the one or more other connected agents via a data diffusion process.

In the following description, numerous details are set forth. It will be apparent, however, to one skilled in the art that embodiments of the present invention may be practiced without these specific details. In other instances, well-known structures, devices, and techniques have not been shown in detail, in order to avoid obscuring the understanding of the description. The description is thus to be regarded as illustrative instead of limiting.

Reference in the specification to "one embodiment" or "an embodiment" means that a particular feature, structure, or characteristic described in connection with the embodiment is included in at least an embodiment of the invention. The appearances of the phrase "in one embodiment" in various places in the specification are not necessarily all referring to the same embodiment.

Also, select embodiments of the present invention include various operations, which are described herein. The operations of the embodiments of the present invention may be performed by hardware components or may be embodied in machine-executable instructions, which may be in turn utilized to cause a general-purpose or special-purpose processor, or logic circuits programmed with the instructions, to perform the operations. Alternatively, the operations may be performed by a combination of hardware and software.

Moreover, embodiments of the present invention may be provided as computer program products, which may include machine-readable medium having stored thereon instructions used to program a computer (or other electronic devices) to perform a process according to embodiments of the present invention. The machine-readable medium may include, but is not limited to, floppy diskettes, hard disk, optical disks, CD-ROMs, and magneto-optical disks, read-only memories (ROMs), random-access memories (RAMs), erasable programmable ROMs (EPROMs), electrically EPROMs (EEPROMs), magnetic or optical cards, flash memory, or other types of media or machine-readable medium suitable for storing electronic instructions and/or data. Moreover, data discussed herein may be stored in a single database, multiple databases, or otherwise in select forms (such as in a table).

Embodiments of the invention introduce a novel mechanism for data migration across networks. This mechanism provides a solution to the scalability problem previously mentioned by modeling a data and event management network as a large network of simple agents, where each agent is responsible for generating the event data for the system on which it runs. As used herein, event data may include any data defining an event, measurement, or telemetry data associated with components of a data and event management network.

The agents interact with each other in random ways that cause copies of the event data to quickly "diffuse" through the network. As new event data is injected into the data diffusion network, older event data "evaporates" away ensuring that the network contains primarily recent event data. The data diffusion network technology also adds another mechanism that allows agents that are interested in specific event data to cause copies of that event data to "migrate" from other areas in the network toward the interested agent.

Overall Data Diffusion Network Architecture

Figure 1:
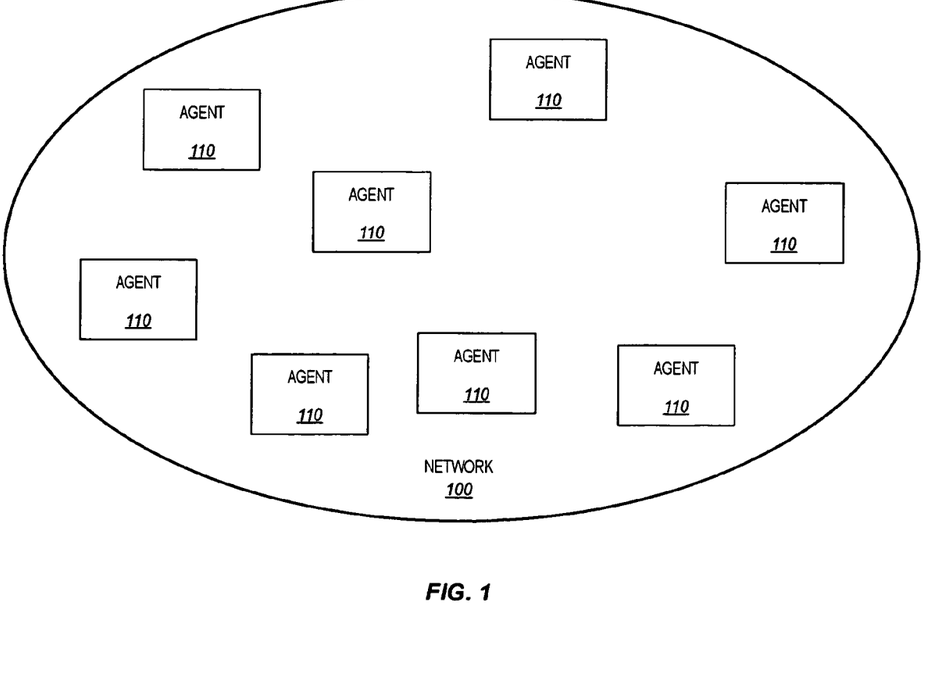
FIG. 1 is a block diagram of an exemplary network to apply a data and event management system of embodiments of the invention.

FIG. 1 is a block diagram illustrating an exemplary network to apply a data and event management system of embodiments of the invention. Network 100 includes multiple system nodes 110 that are communicatively coupled. The system nodes 110, also known as agents 110, may include any client system, such as a data center or a computing station.

In prior systems, one of the agents 110 may have been, for example, a system of a central organization of the network 100. Under such a prior art organization, any event data produced from agents 110 would have been funneled to the system node for analysis and event management.

In comparison, embodiments of the present invention create random (in some embodiments, unidirectional) connections between the agents 110 in the network 100. Each agent 110 may be a component that is monitored by a data and event management network of embodiments of the invention.

Figure 2:
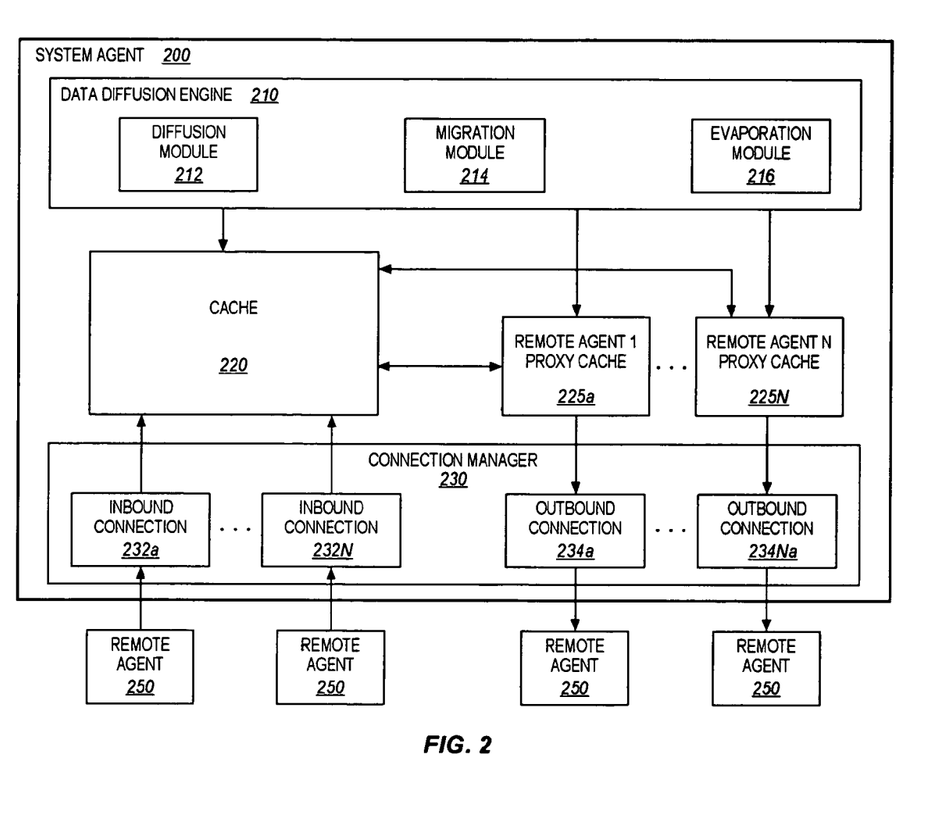
FIG. 2 is a block diagram illustrating an exemplary agent of a data and event management network of embodiments of the invention.

FIG. 2 is a block diagram of an exemplary agent of the data and event management network of embodiments of the invention. In one embodiment, agent 200 is the same as agents 110 described with respect to FIG. 1. Agent 200 includes a data diffusion engine 210, a local cache 220, remote proxy caches 225a-2215N, and a communication manager 230.

The data diffusion engine 210 includes a diffusion module 212, a migration module 214, and an evaporation module 216. The modules 212, 214, 216 of the data diffusion engine allow the agent 200 to perform various processes, such as diffusion, evaporation, and migration of event data. These processes will be described in greater detail in the description further below.

Agent 200 maintains a local cache 220 to store a subset of the event data that is diffusing through the data and event management network. Agent 200 further maintains remote agent proxy caches 225a-225N to optimize transfers between it and other agents to which agent 200 is connected.

The communication manager 230 includes inbound connections 232a-232N and outbound connections 234a-234N. The communication manager 230 is responsible for accepting inbound connection requests from remote agents, as well as initiating outbound connection requests to random agents. It is also responsible for periodically terminating outbound connections and then reconnecting with a new random remote agent. In one embodiment, inbound connections 232a-232N and outbound connections 234a-234N are the physical links between other agents in the network to which agent 200 is communicatively coupled to perform the different processes of the data diffusion engine 210.

Agent 200 interacts with the other connected agents in random ways that cause copies of its event data to quickly "diffuse" through the data and event management network (e.g., network 100 described with respect to FIG. 1). As new event data is injected into the network by agent 200, older event data "evaporates" away ensuring that the network contains primarily recent event data. Furthermore, if agent 200 is interested in obtaining specific event data from the data and event management network, it may inject a template into its local cache that cause copies of matching event data to "migrate" from other remote agents in the network toward agent 200.

Agent 200 relies on its connections to other agents in order to diffuse, evaporate, and migrate event data. Accordingly, agent 200 utilizes the communication manager 230 to randomly form, tear down, and reform its connections with other remote agents via a connection churning process. This connection churning process of the communication manager 230 relies on address information of other remote agents stored in the local cache 220 of agent 200 to form, tear down, and reform its connections. In some embodiments, this address information is treated the same way as regular data by agent 200.

Figure 3:
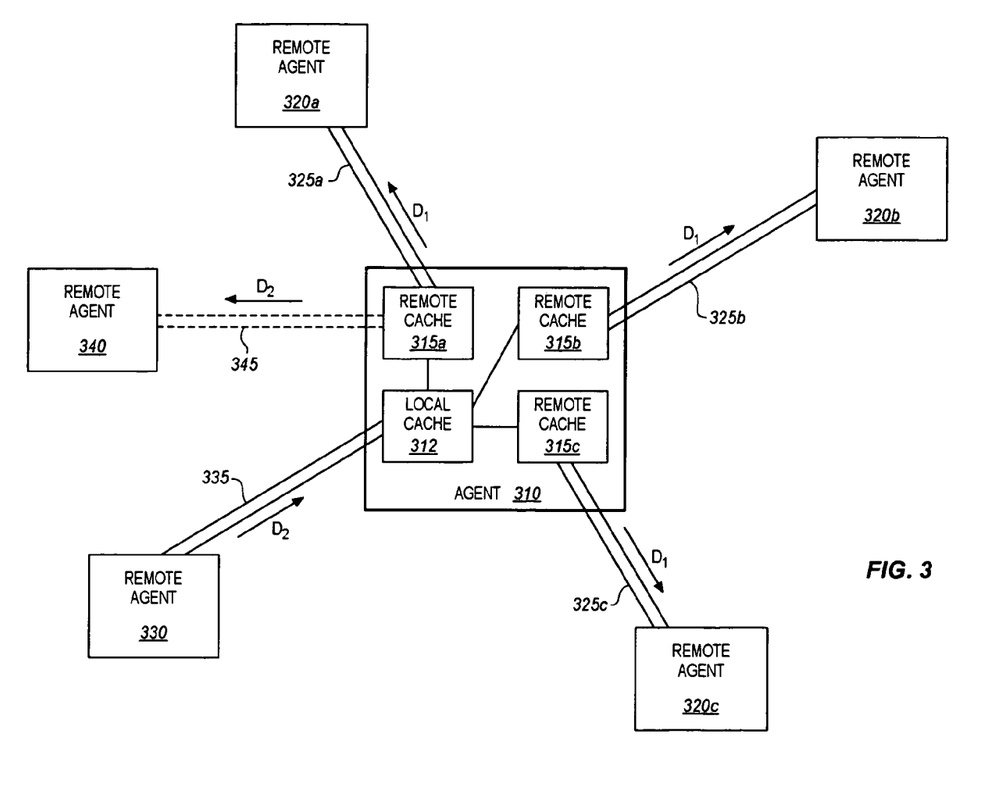
FIG. 3 is a block diagram illustrating exemplary random connections between agents of a data and event management network of embodiments of the invention.

FIG. 3 is a block diagram illustrating exemplary random connections between agents of a data and event management network of embodiments of the invention. System 300 includes multiple agents 310, 320a-c, 330, 340. In one embodiment, these agents 310, 320a-c, 330, 340 are the same as agents 110 and 200 described with respect to FIGS. 1 and 2. For instance, agent 310 includes a local cache 312 and multiple remote caches 315a-c, similar to agent 200 described with respect to FIG. 2.

In one embodiment, agent 310 may have multiple connections to other agents. As illustrated, agent 310 is randomly connected to remote agents 320a, 320b, and 320c. Remote cache 315a is used for the connection 325a to remote agent 320a, remote cache 315b is used for the connection 325b to remote agent 320b, and remote cache 315c is used for the connection 325c to remote agent 320c. The connections 325a-c between agent 310 and the other remote agents 320a-c may be established via a connection churning process.

In some embodiments, connections 325a-c are unidirectional connections, so that event data from remote caches 315a-c only travels from agent 310 towards remote agents 320a-c. In other embodiments, the connections 325a-c may be bidirectional. Remote cache 315a-c may obtain event data from local cache 312 to temporarily store until the time to transfer the event data via connections 325a-c to the connected remote agents 320a-c.

In one embodiment, other remote agents may also create connections to agent 310. For example, remote agent 330 may have a connection from its remote cache not shown) to the local cache 312 of agent 310. In some embodiments, this connection 335 may be a unidirectional connection from remote agent 330 to agent 310. Remote agent 330 may then supply event data from its cache to the local cache 312 of agent 310. In other embodiments, the connection 335 between remote agent 330 and agent 310 may be bidirectional.

In some embodiments, one or more of the connection 325a-c may be broken or removed and another connection 345 may be established or reformed between agent 310 and another remote agent 340. Event data from the local cache 312 of agent 310 may be placed in a remote cache 315a and transferred to a cache (not shown) of the newly connected remote agent 340.

Figure 4:
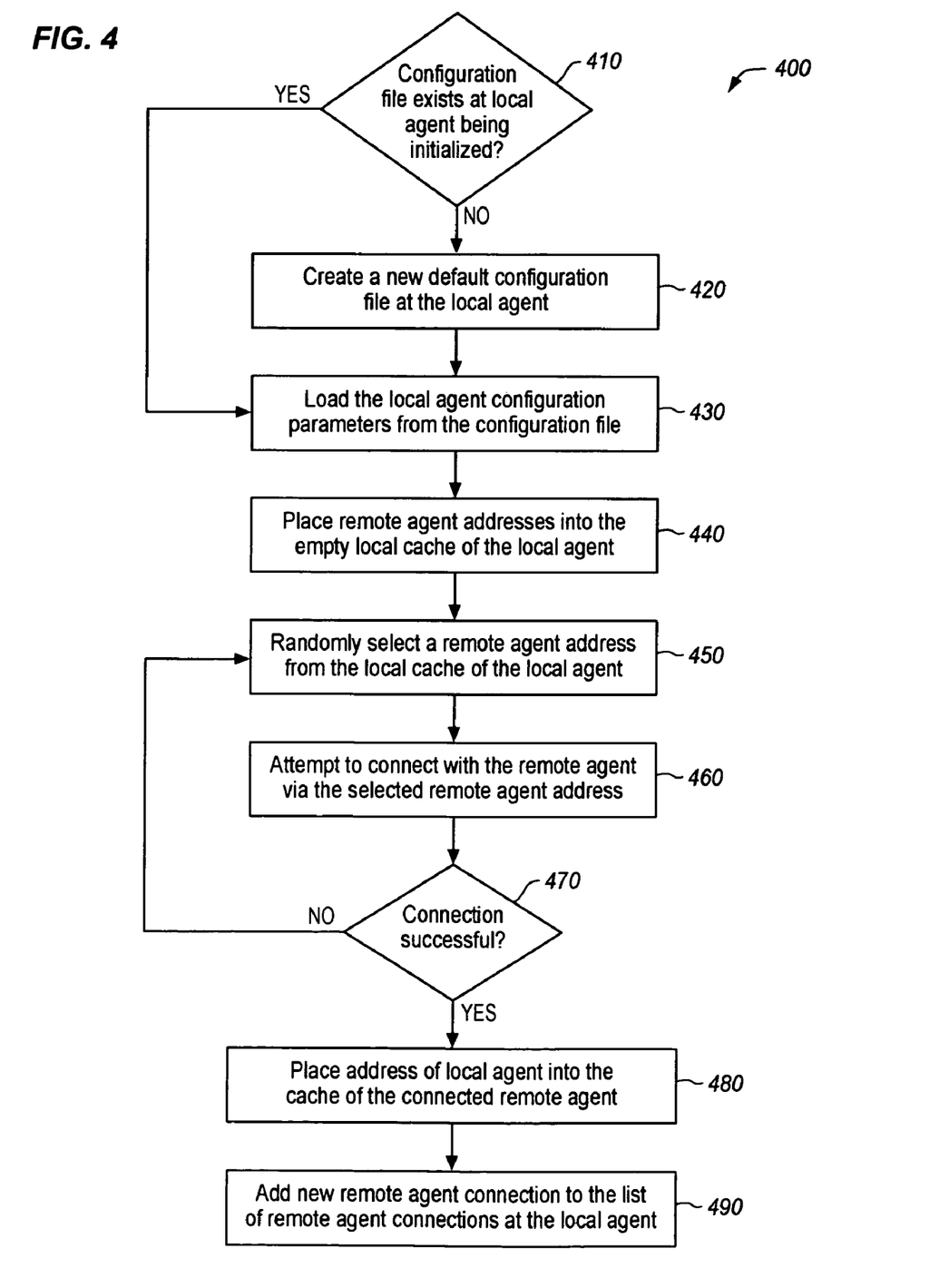
FIG. 4 is a flow diagram depicting a method of agent initialization according to one embodiment of the invention.

FIG. 4 is a flow diagram depicting a method of one embodiment of the invention. Process 400 is a method to initialize connections between agents in a data and event management network of embodiments of the invention. In one embodiment, process 400 is performed by either of agent 110 or 200 described with respect to FIG. 1 or 2.

Process 400 begins at decision block 410, where it is determined whether a configuration file exists at a local agent being initialized. If so, then the process proceeds to processing block 420, which is discussed further below. If not, then, at processing block 430, a new default configuration file is created at the local agent. In one embodiment, this default configuration file may seed the local agent with address information of five well-known agents in the data and event management network, for example. One skilled in the art will appreciate that the number of seed agents could be any number greater than zero. In general, seeding with five initial agents provides enough redundancy to avoid network fragmentation.

At processing block 440, remote agent address information from the configuration file is placed into an empty local cache of the local agent. Then, at processing block 450, a remote agent address is randomly selected from the local cache. At processing block 460, the local agent attempts to connect with the remote agent via the selected remote agent address.

At decision block 470, it is determined whether the connection was successful. If not, then the process returns to processing block 450 where another address for the local agent to connect to is retrieved. On the other hand, if the connection was successful, then the process continues to processing block 480, where the address information of the local agent is placed in a local cache of the remote agent. Finally, at processing block 490, the local agent adds the remote agent connection to a list of remote agent connections stored at the local agent.

Figure 5:
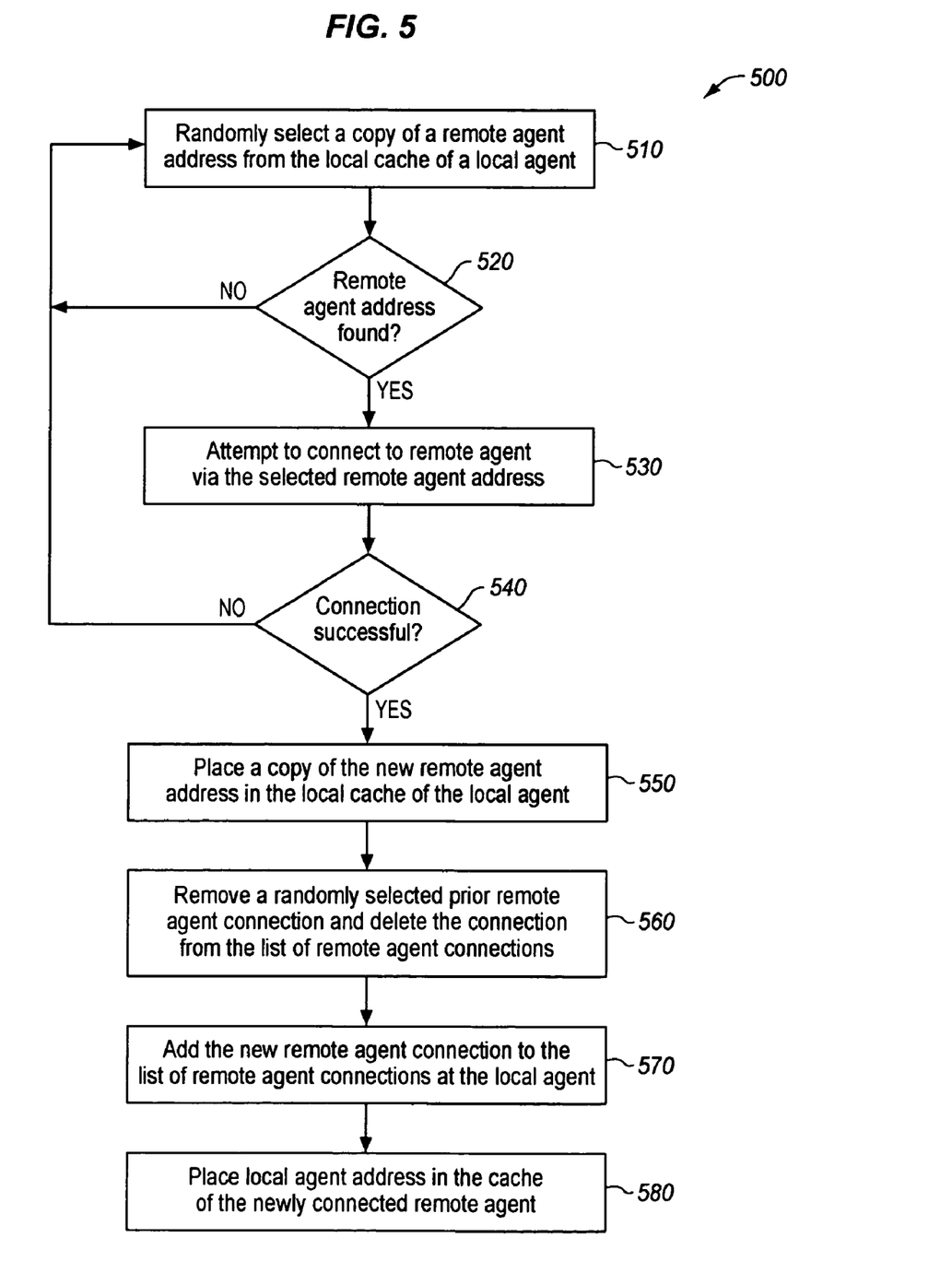
FIG. 5 is a flow diagram depicting a method of connection churning at an agent according to one embodiment of the invention.

FIG. 5 is a flow diagram depicting a method of one embodiment of the invention. Process 500 is a method to churn connections between agents in a data management network of embodiments of the invention. In one embodiment, process 500 is performed by agent 110 or 200 described with respect to FIG. 1 or 2. More specifically, in one embodiment, process 500 is performed by connection manager 230 described with respect to FIG. 2.

Process 500 begins at processing block 510, where a local agent randomly selects a copy of a remote agent address from its local cache. At decision block 520, it is determined whether any addresses were found. If not, the local agent reiteratively continues searching its local cache at processing blocks 510 and 520 until an address is found.

If an address is found successfully at decision block 520, then the local agent attempts to connect to the remote agent via the address at processing block 530. At decision block 540, it is determined whether the connection is successful. If not, then the process returns to processing block 510 to select another address from the local cache.

If the connection is successful, then a copy of the new remote agent address is placed in the local cache of the local agent at processing block 550. Then, at processing block 560, a randomly selected connection that already exists between the local agent and another remote agent is removed from the list of remote agent connections. At processing block 570, the newly selected remote agent connection is added to the list of remote agent connections. At processing block 580, the address of the local agent is placed into a local cache of the newly connected remote agent.

Embodiments of the data and event management network provide a novel mechanism that allows very large scale data and event management networks (of hundreds of thousands of systems or more) to be formed and managed in a cost effective way. System event data is a good example of the type of data that may benefit from the management mechanism of embodiments of the invention. In addition, massive large-scale networks like radio frequency identification (RFID) tags and "smart dust" type applications may be ideally suited for the embodiments of the data and event management network described herein.

An advantage to the data and event management network approach of embodiments of the invention is that there is no centralized data/event collection point to act as a bottleneck or single-point of failure. The systems involved in the data and event management network of embodiments of the invention are the systems that are being managed, so that as a result the management costs scale linearly.

Data Diffusion and Evaporation

In some embodiments, agents of the overall system architecture for the data and event management network described above interact with the other connected agents in random ways that cause copies of their event data to quickly "diffuse" through the network. This event data is transmitted to the other agents via the random connections created by each agent according to the above-described processes.

Figure 6:
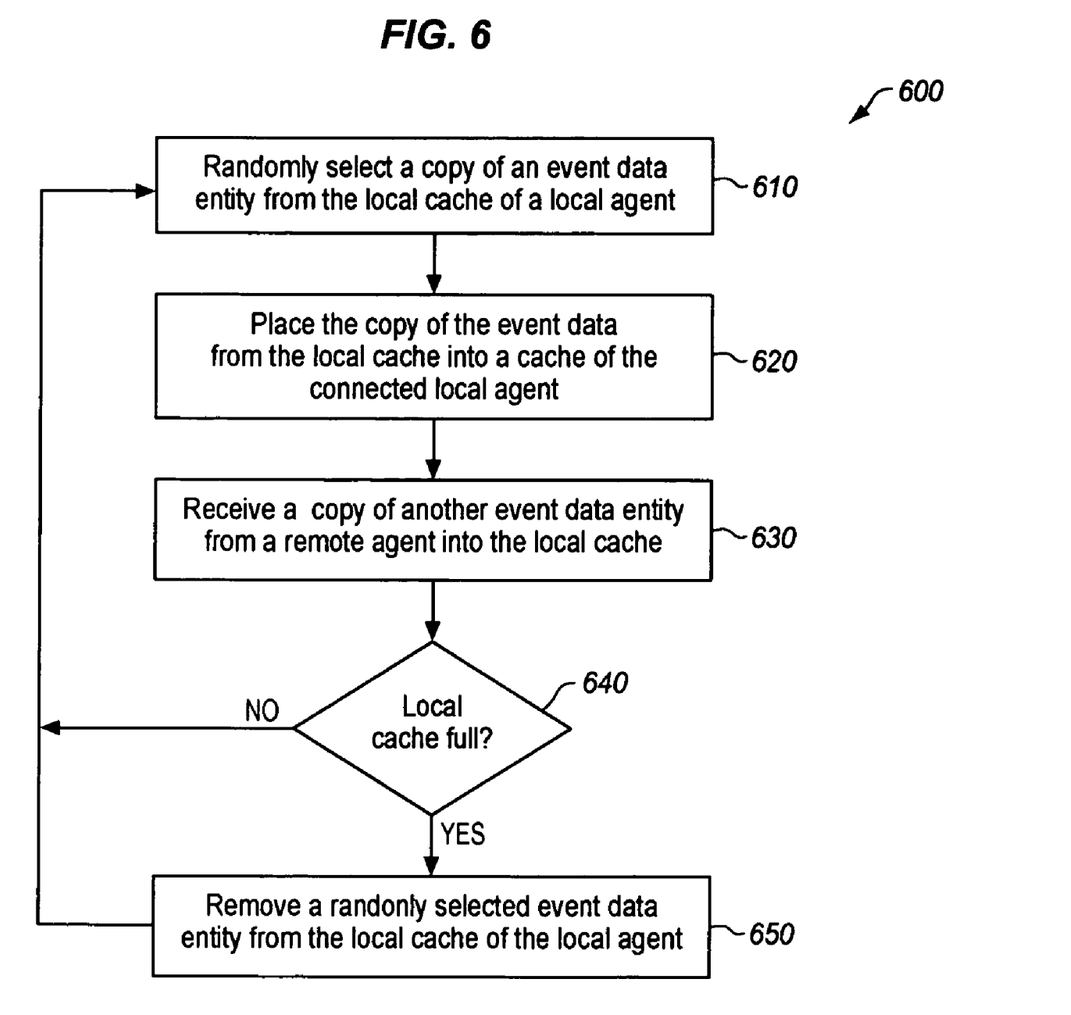
FIG. 6 is a flow diagram depicting a method of data diffusion and evaporation according to an embodiment of the invention.

FIG. 6 is a flow diagram depicting a method of data diffusion and evaporation according to embodiments of the invention. In some embodiments, process 600 is performed by agent 110 or 200 described with respect to FIG. 1 or 2. For instance, process 600 may be performed by diffusion module 212 and evaporation module 216 described with respect to FIG. 2.

Process 600 begins at processing block 610, where a local agent randomly selects a copy of an event data entity from its local cache. Then, at processing block 620, the local agent places the copy of the event data from its local cache into a cache of the connected remote agent. In some embodiments, the local agent may optimize the transfer of the event data by utilizing one or more remote proxy caches at the local agent. In this case, the local agent would cache the copy of the event data into a remote proxy cache that corresponds to a connection with a remote agent. Then, this event data would be swapped across the network in an exchange according to a pre-determined time interval (e.g., every few seconds).

At processing block 630, the local agent receives into its local cache a copy of another event data entity from a remote agent. Then, at decision block 640, the local agent determines whether its local cache has reached a capacity limit. If not, the local agent may continue to perform process 600 beginning at processing block 610. If the local cache is full, then at processing block 650, the local agent randomly selects an event data entity from its local cache to remove. It should be noted that this random selection does not consider the amount of time the event data has been in the local cache or the importance of the event data, it is purely a random selection process. Then, the local agent may continue performing process 600 beginning at processing block 610.

Migration

When an agent of the overall system architecture described above seeks to obtain particular event data of interest from the data management network, it creates a template for the event data it seeks and places it into its local cache. Then, the agent may follow a particular migration process in order to seek out this event data from the data and event management network.

Figure 7:
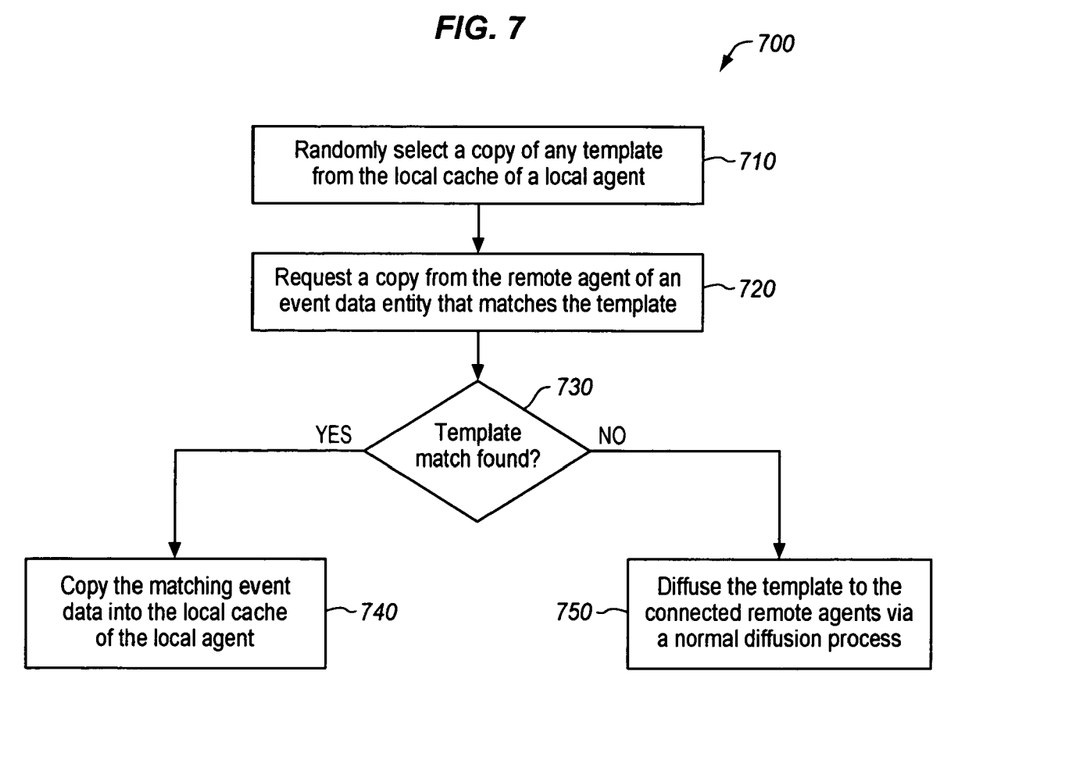
FIG. 7 is a flow diagram depicting a method of data migration according to an embodiment of the invention.

FIG. 7 is a flow diagram depicting one embodiment of a method for this data migration. In some embodiments, process 700 is performed by agent 110 or 200 described with respect to FIG. 1 or 2. For instance, process 700 may be performed by migration module 214 described with respect to FIG. 2.

Process 700 begins at processing block 710, where a local agent randomly selects a copy of any template from its local cache. It may be assumed that the template was previously constructed and placed into the local cache of the local agent. At processing block 720, the local agent requests, from one or more of its randomly connected agents, copies of any matching event data entities for the template. At decision block 730, it is determined whether a template match is found. If so, the local agent places copies the matching event data into its local cache at processing block 740.

However, if no match is found, then the local agent does nothing and allows the templates to diffuse to its connected remote agents via the normal data diffusion process at processing block 750. In one embodiment, this normal data diffusion process is process 600 described with respect to FIG. 6. In some embodiments, the local agent may actively copy the template to the remote agent's cache instead of waiting for the template to diffuse via the normal data diffusion process.

According to process 700, when an agent of the network has an event data match for the template, the local agent that last sent the template to the agent copies this event data into its local cache. In this way, the data follows, in an inverse direction, the path of the template in individual exchanges of template-for-event data until the event data reaches the requesting agent. Accordingly, each agent only has to follow the simple rule of copying the matching event data into its local cache, rather than having to track the original requesting agent throughout the network (local knowledge vs. global knowledge).

Figure 8:
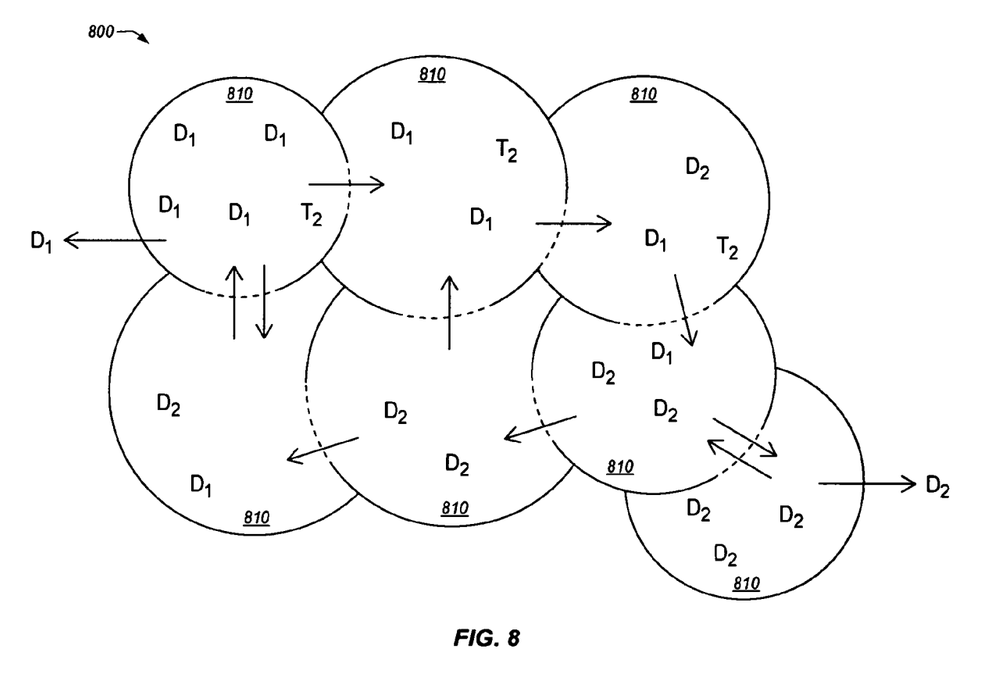
FIG. 8 is a block diagram depicting a data diffusion, evaporation, and migration process in a data and event management network according to an embodiment of the invention.

FIG. 8 is a block diagram depicting data diffusion, evaporation, and migration processes in a data and event management network according to embodiments of the invention. In some embodiments, system 800 may be a data and event management network described with respect to various embodiments of the invention. The system 800 includes multiple agents 810. In one embodiment, agents 810 are the same as agents 110 and 200 described with respect to FIGS. 1 and 2.

As illustrated, agents 810 are depicted as interconnected "bubbles". Each agent 810 is a provider of multiple connections to other agents in the system 800, as well as a recipient of connections from other agents 810. The connections between agents 810 are represented by the dashed lines. An agent 810 may provide event data (e.g., D1 or D2) from its local cache to other agents. An agent 810 may also receive event data (e.g., D1 or D2) from other agents' local caches. Similarly, an agent 810 may create a template (e.g., T2) to actively find certain event data in system 800. In one embodiment, the event data and templates may be transmitted among agents 810 according to processes 600 and 700 described with respect to FIGS. 6 and 7.

By analogy, when the event data (D1 and/or D2) moves according to process 600, it is like a gas molecule in the bubble, randomly moving from one bubble to the next through the various openings between the bubbles. In this way, the event data is able to diffuse throughout the system 800 to multiple agents, with multiple copies of the event data maintained in the system. For instance, event data D1 may initially be concentrated in an agent 810 on side of the system 800, while event data D2 may be concentrated in another agent 810 on another side of the network. This event data D1 and D2 is diffused out into the network to eventually be possibly copied into all of the agents.

In addition, as each local cache reaches its capacity, the agent randomly selects event data to be evaporated (i.e., deleted) from the local cache in order to make room for new event data. As illustrated, event data D1 is shown being evaporated from one agent 810, while event data D2 is being evaporated from another agent to make room for more event data in those agents 810.

Furthermore, an agent 810 may create a template T2 to search out event data D2, for example. As illustrated, T2 may start in the agent 810 with only copies of event data D1. This template may diffuse out into the network according to a normal data diffusion process causing the event data D2 to migrate towards the template-originating agent 810.

Figure 9:
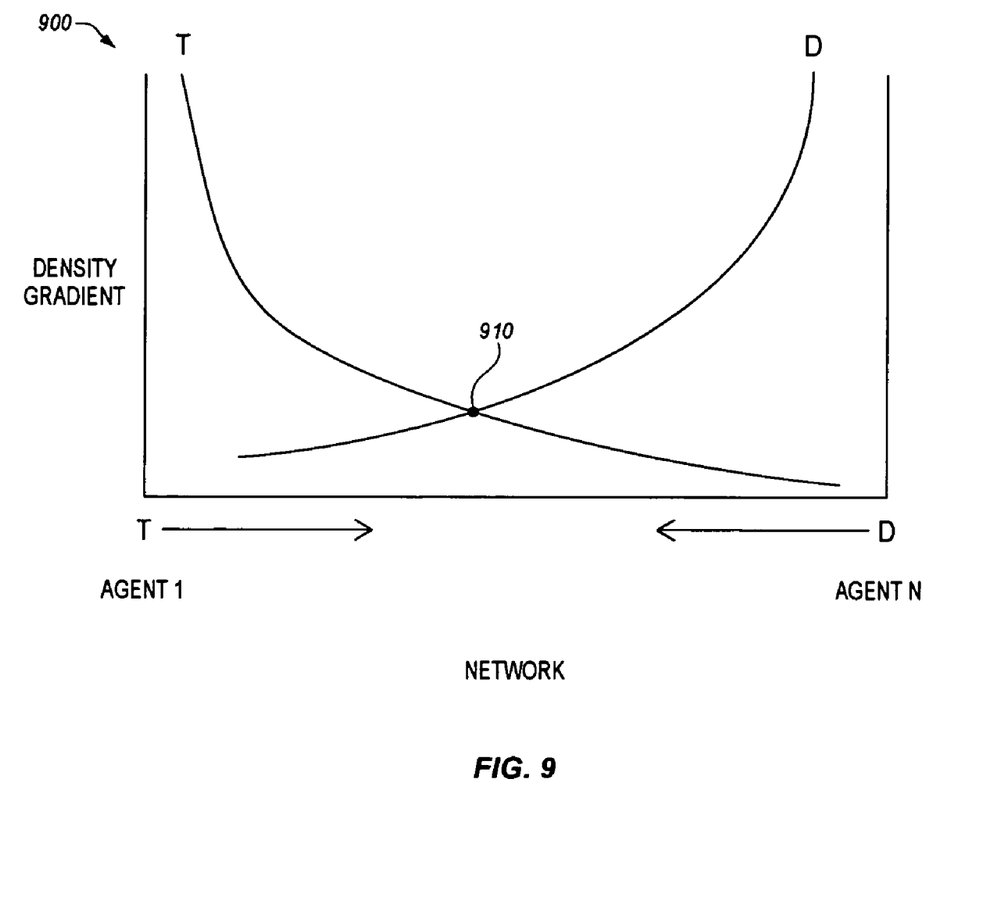
FIG. 9 is a graph depicting a density gradient in a data and event management network of an embodiment of the invention.

FIG. 9 is a graph depicting a density gradient in a data management network resulting from the data migration processes of embodiments of the invention. In one embodiment, the data migration process is the same as process 700 described with respect to FIG. 7. If it is assumed that constant connections are maintained in a network, then the event data will migrate towards templates in the network and eventually meet a template so that the event data may be copied back to the requesting agent.

For example, in a system such as system 800 described with respect to FIG. 8, there are may be copies of templates T2 at a single agent 810 on one side of the network, and many copies of event data D2 at another single agent 810 on another side of the network. Utilizing the data diffusion and evaporation techniques of embodiments of the invention, template T2 and event data D2 will disperse towards other agents 810 throughout the network. Over time, the template T and event data D2 would eventually meet so that a matching copy of the event data could be sent back to the agent 810 originating the template T2 in system 800.

Graph 900 illustrates this density gradient of template T and event data D. The templates T of agent 1 travel from left to right, while the event data D of agent N travels from right to left. The horizontal axis of graph 900 generally indicates dispersion of the template or event data throughout the network. The density gradient increases from bottom to top. As illustrated, the density of both of template T and event data D steeply decreases as it is initially diffused and then gradually levels off for an even distribution throughout the network. The density gradients of template T and event data D reach a point 910 in the graph where they intersect and their density gradients are equal, indicating the point in the network with the template locates the matching event data. Such a point 910 represents even distribution of the template T and event data D throughout a data and event management network.

In summary, for very large scale system management networks, the data and event management network of embodiments of the invention is simple to implement and resilient to changes in network configuration and crashes. Because event data is diffusing through the network across random connections between agents, the event data diffuses around problem areas automatically. Furthermore, as event data is not stored centrally, it should not be lost if a disk, system, or even a subnetwork crashes. In addition, the data migration process allows interesting event data to migrate toward the agents that are interested in it and allows the interesting event data to stay in the system while the uninteresting event data "evaporates" away.

Figure 10:
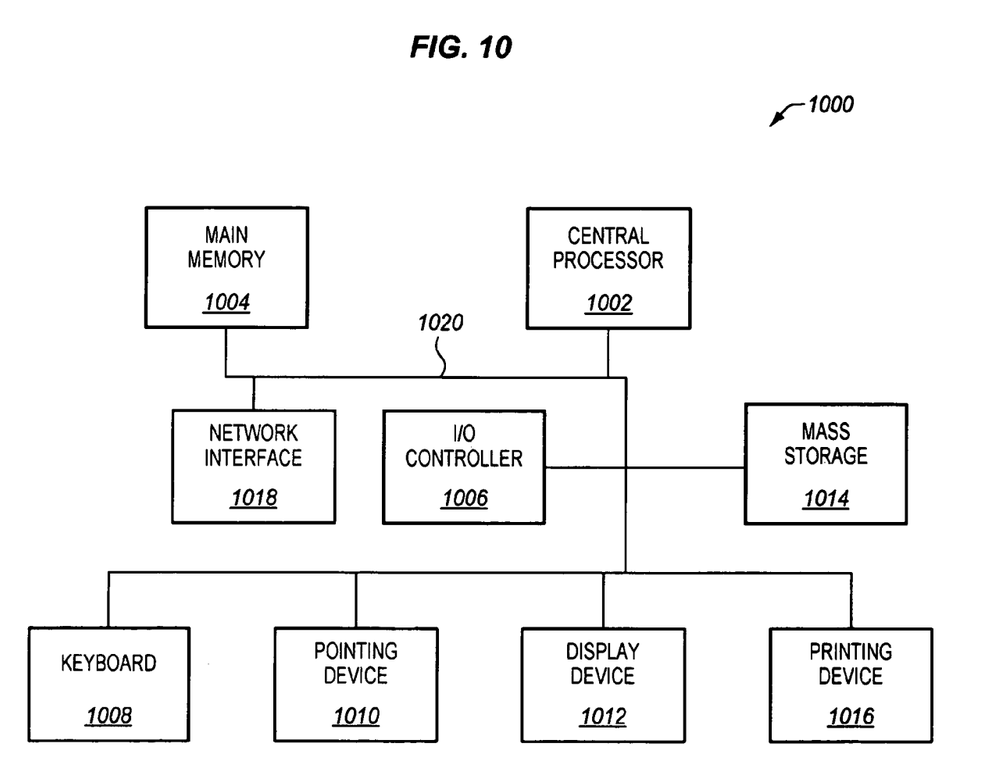
FIG. 10 is an illustration of an embodiment of a computer system.

FIG. 10 illustrates an exemplary computer system 1000 in which certain embodiments of the present invention may be implemented. In one embodiment, the components of FIG. 1 or 2 may be implemented as system 1000 or as components of system 1000.

System 1000 comprises a central processor 1002, a main memory 1004, an input/output (I/O) controller 1006, a keyboard 1008, a pointing device 1010 (e.g., mouse, track ball, pen device, or the like), a display device 1012, a mass storage 1014 (e.g., a nonvolatile storage such as a hard disk, an optical drive, and the like), and a network interface 1018. Additional input/output devices, such as a printing device 1016, may be included in the system 1000 as desired. As illustrated, the various components of the system 1000 communicate through a system bus 1020 or similar architecture.

In a further embodiment, system 1000 may be a distributed computing system. In other words, one or more of the various components of the system 1000 may be located in a physically separate location than the other components of the system 1000. Such components may be accessed and connected via a network to the other components In accordance with an embodiment of the present invention, the computer system 1000 includes a Sun Microsystems computer utilizing a SPARC microprocessor available from several vendors (including Sun Microsystems, Inc., of Santa Clara, Calif.). Those with ordinary skill in the art understand, however, that any type of computer system may be utilized to embody the present invention, including those made by Hewlett Packard of Palo Alto, Calif., and IBM-compatible personal computers utilizing Intel microprocessor, which are available from several vendors (including IBM of Armonk, N.Y.).

Also, instead of a single processor, two or more processors (whether on a single chip or on separate chips) can be utilized to provide speedup in operations. It is further envisioned that the processor 1002 may be a complex instruction set computer (CISC) microprocessor, a reduced instruction set computing (RISC) microprocessor, a very long instruction word (VLIW) microprocessor, a processor implementing a combination of instruction sets, and the like.

The network interface 1018 provides communication capability with other computer systems on a same local network, on a different network connected via modems and the like to the present network, or to other computers across the Internet. In various embodiments of the present invention, the network interface 1018 can be implemented utilizing technologies including, but not limited to, Ethernet, Fast Ethernet, Gigabit Ethernet (such as that covered by the Institute of Electrical and Electronics Engineers (IEEE) 801.1 standard), wide-area network (WAN), leased line (such as T1, T3, optical carrier 3 (OC3), and the like), analog modem, digital subscriber line (DSL and its varieties such as high bit-rate DSL (HDSL), integrated services digital network DSL (IDSL), and the like), cellular, wireless networks (such as those implemented by utilizing the wireless application protocol (WAP)), time division multiplexing (TDM), universal serial bus (USB and its varieties such as USB II), asynchronous transfer mode (ATM), satellite, cable modem, and/or FireWire.

Moreover, the computer system 1000 may utilize operating systems such as Solaris, Windows (and its varieties such as CE, NT, 2000, XP, ME, and the like), HP-UX, IBM-AIX, PALM, UNIX, Berkeley software distribution (BSD) UNIX, Linux, Apple UNIX (AUX), Macintosh operating system (Mac OS) (including Mac OS X), and the like. Also, it is envisioned that in certain embodiments of the present invention, the computer system 1000 is a general purpose computer capable of running any number of applications such as those available from companies including Oracle, Siebel, Unisys, Microsoft, and the like.

It should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

The foregoing description has been directed to specific embodiments. It will be apparent to those with ordinary skill in the art that modifications may be made to the described embodiments, with the attainment of all or some of the advantages. Therefore, it is the object of the appended claims to cover all such variations and modifications as come within the spirit and scope of the invention.

What is claimed is:

1. A method comprising:

randomly selecting a template from a local cache at an agent, the template indicating one or more characteristics of event data entities the agent is searching for;

querying, via random connections from the agent, one or more other connected agents for the event data entities matching the template;

if a matching event data entity for the template is found, returning the matching event data entity to the local cache of the agent;

if a matching event data entity for the template is not found, diffusing the template to the one or more connected agents via a data diffusion process; and wherein the one or more other agents that receive the diffused template perform the randomly selecting, querying, and at least one of returning or diffusing in order to locate the event data entities for the template.

2. The method of claim 1, wherein when a matching event data entity is found, the matching event data entity is returned to an agent that most recently diffused the template.

3. The method of claim 1, wherein the agent includes a data diffusion engine having a migration module to perform the randomly selecting, querying, and at least one of returning or diffusing.

4. The method of claim 1, wherein each agent maintains event data entities for a data management network without utilizing a central management server.

5. The method of claim 1, wherein the random connections between each agent are continually broken down and reformed between different agents.

6. An article of manufacture, comprising a machine-readable medium including data that, when accessed by a machine, cause the machine to perform operations comprising:

randomly selecting a template from a local cache at an agent, the template indicating one or more characteristics of event data entities the agent is searching for;

querying, via random connections from the agent, one or more other connected agents for the event data entities matching the template;

if a matching event data entity for the template is found, returning the matching event data entity to the local cache of the agent;

if a matching event data entity for the template is not found, diffusing the template to the one or more other connected agents via a data diffusion process; and wherein the one or more other agents that receive the diffused template perform the randomly selecting, querying, and at least one of returning or diffusing in order to locate the event data entities for the template.

7. The article of manufacture of claim 6, wherein when a matching event data entity is found, the matching event data entity is returned to an agent that most recently diffused the template.

8. The article of manufacture of claim 6, wherein the agent includes a data diffusion engine having a migration module to perform the randomly selecting, querying, and at least one of returning or diffusing.

9. The article of manufacture of claim 6, wherein each agent maintains event data entities for a data management network without utilizing a central management server.

10. The article of manufacture of claim 6, wherein the random connections between each agent are continually broken down and reformed between different agents.

11. An apparatus, comprising:

a local cache to maintain event data of a data management network without utilizing a central management server; and a data diffusion engine coupled to the local cache and including a migration module to:

randomly select a template from the local cache, the template indicating one or more characteristics of event data entities the apparatus is searching for;

query, via random connections from the apparatus, one or more other connected agents for the event data entities matching the template;

if a match for the template is found, return the matching event data entities to the local cache;

if a match for the template is not found, diffuse the template to the one or more other connected agents via a data diffusion process; and wherein the one or more other agents that receive the diffused template perform the randomly selecting, querying, and at least one of returning or diffusing in order to locate the event data entities for the template.

12. The apparatus of claim 11, wherein when a marching event data entity is found, the matching event data entity is returned to an agent that most recently diffused the template.

13. The apparatus of claim 11, further comprising a data diffusion engine having a migration module to perform the randomly selecting, querying, and at least one of returning or diffusing.

14. The apparatus of claim 11, wherein the random connections between the apparatus and the agents are continually broken down and reformed with different agents.

* * * * *

UNITED STATES PATENT AND TRADEMARK OFFICE
CERTIFICATE OF CORRECTION

| | | |
|---|---|---|
| PATENT NO. | : 7,685,226 B1 | Page 1 of 1 |
| APPLICATION NO. | : 11/499158 | |
| DATED | : March 23, 2010 | |
| INVENTOR(S) | : Derk D. Norton et al. | |

It is certified that error appears in the above-identified patent and that said Letters Patent is hereby corrected as shown below:

Column 12, Line 1 of Claim 12:

Delete "marching" and insert -- matching --.

Signed and Sealed this

First Day of June, 2010

David J. Kappos
*Director of the United States Patent and Trademark Office*